United States Patent
Bauer

[11] Patent Number: 5,919,371
[45] Date of Patent: Jul. 6, 1999

[54] USE OF SHEET SILICATES

[75] Inventor: Harald Bauer, Kerpen, Germany

[73] Assignee: Clariant GmbH, Frankfurt, Germany

[21] Appl. No.: 08/829,490

[22] Filed: Mar. 27, 1997

[30] Foreign Application Priority Data

Apr. 1, 1996 [DE] Germany .......................... 196 13 060

[51] Int. Cl.$^6$ .................................................... C02F 1/28
[52] U.S. Cl. ........................................... 210/688; 210/912
[58] Field of Search ..................................... 210/688, 912

[56] References Cited

U.S. PATENT DOCUMENTS

| | | | |
|---|---|---|---|
| 4,121,903 | 10/1978 | Smolka | 8/137 |
| 5,370,827 | 12/1994 | Grant et al. | 210/688 |
| 5,478,389 | 12/1995 | Loomis | 106/630 |

FOREIGN PATENT DOCUMENTS

| | | |
|---|---|---|
| 164514 | 4/1985 | European Pat. Off. . |
| 578986 | 6/1993 | European Pat. Off. . |
| 578987 | 6/1993 | European Pat. Off. . |
| 615955 | 2/1994 | European Pat. Off. . |
| 618592 | 10/1994 | European Pat. Off. . |
| 1555977 | 1/1969 | France . |
| 2658807 | 8/1991 | France . |
| 2719304 | 11/1995 | France . |
| 97/03018 | 2/1996 | WIPO . |

*Primary Examiner*—Ivars Cintins
*Attorney, Agent, or Firm*—Miles B. Dearth

[57] ABSTRACT

The invention relates to the use of sheet silicates of the general formula $$NaMSi_xO_{2x-1} \cdot yH_2O$$

in which x is from 1.9 to 4, M is Na or H and y is from 0 to 20, for removing heavy metals from aqueous systems.

10 Claims, No Drawings

USE OF SHEET SILICATES

The invention relates to the use of sheet silicates of the general formula $NaMSi_xO_{2x-1} \cdot yH_2O$, in which x is from 1.9 to 4, M is Na or H and y is from 0 to 20, for removing heavy metals from aqueous systems.

Sheet silicates have long been known. They are advantageously used in the detergent and cleaning industry; a number of sheet silicates are also used as thickeners or for the preparation of thickener systems with thixotropic applications.

Aqueous systems used in industry and in private households, including tap water, often still contain a small but measurable proportion of substances which may interfere with washing or cleaning processes or which have to be removed from the respective aqueous system for economic and ecological reasons. This applies in particular to heavy metals, which, for example, have a decomposing effect on peroxide-containing compositions as frequently encountered in detergents.

It is the object of the present invention to provide a composition which enables heavy metals to be removed from aqueous solutions.

This object is achieved by the use of sheet silicates of the general formula $NaMSi_xO_{2x-1} \cdot yH_2O$ in which x is from 1.9 to 4, M is Na or H and y is from 0 to 20, for removing heavy metals from aqueous systems.

The heavy metals are preferably manganese, copper and/or zinc.

The aqueous system preferably has a pH of from 7 to 13, in particular from 8 to 12 and particularly preferably from 9.3 to 11.5.

The water hardness in the aqueous system is preferably from 0 to 43 degrees of German hardness.

Particularly preferably, the water hardness in the aqueous system is from 2 to 30 degrees of German hardness.

In particular, the water hardness in the aqueous system is from 5 to 20 degrees of German hardness.

The aqueous system preferably originates from wash liquors, liquors from dishwashers, effluent, industrial wastewater, cooling water, cleaning water or other aqueous systems. However, it may also be tap water, in particular tap water which may be used for flushing lavatories, for cooling systems or for washing. Such tap water need not necessarily meet the drinking water standard.

The aqueous system preferably contains washing assistants, surfactants, bleach activators, bleach systems, graying inhibitors, builders or builder systems, enzymes, optical brighteners, foam regulators, fillers and/or polymers.

The surfactants are preferably anionic and/or nonionic surfactants.

The surfactants are preferably also nonionic and/or cationic surfactants.

The filler is preferably sodium sulfate.

The polymers are preferably homopolymeric or copolymeric carboxylic acids or salts thereof.

Among the carboxylic acids, acrylic acid, methacrylic acid and/or maleic acid or salts thereof are preferred.

The builders and/or builder systems are preferably zeolite A or P, citric acid, sodium citrate, sodium tripolyphosphate, sodium carbonate, sodium bicarbonate and/or organic builders, such as nitriloacetic acid or salts thereof.

Builders and builder systems as mentioned above the various functions—especially in detergents. Primarily, they reduce the substances giving rise to water hardness in tap water. These comprise soluble calcium and magnesium salts which lead, inter alia, to lime formation during the usual heating of the wash or rinse liquor.

These insoluble compounds cause incrustations in the laundry textiles or coatings on crockery and cutlery. Furthermore, the washing machine or dishwater may be damaged by such coatings or incrustations. The heating rods are particularly endangered since they constitute the actual head source in such a machine.

Calcium and magnesium ions can form insoluble compounds, in particular with anionic surfactants such as those usually contained in detergents and rinsing compositions. This reduces the washing power and adversely affects the washing effect. In addition, these insoluble compounds, such as the abovementioned lime, accumulate in the textiles, impairing both the wearing comfort and the life of the textiles.

By reducing the amount of or removing the calcium and magnesium ions from such liquors, the washing power or the rinsing effect in such a system is substantially increased.

If aqueous systems which originate from detergent (waste)waters, dishwater (waste)waters or similar wash liquors are used, they may contain, inter alia, the following substances:

Surfactants: the anionic or nonionic surfactants include soaps, surfactants of the sulfonate and sulfate type and nonionic compounds, for example from the class consisting of the polyglycol ether derivatives. Suitable soaps are derived from natural or synthetic, saturated or mono-unsaturated fatty acids having 12 to 22 carbon atoms. Soap mixtures which are derived from coconut, palm kernel or tallow fatty acids are preferred. Among the sulfonate type, linear alkylbenzenesulfonates and olefin sulfonates and disulfonates and alkanesulfonates are suitable, as well as α-sulfo fatty acids and esters thereof, such as, for example, α-sulfonated and hydrogenated coconut, palm kernel or tallow fatty acid and the methyl or ethyl esters thereof and mixtures thereof.

Surfactants of the sulfate type are also suitable. These are, for example, sulfuric monoesters of primary alcohols, such as fatty alcohols (coconut fatty alcohols, tallow fatty alcohols, oleyl alcohols, lauryl, myristyl, palmitry or stearyl alcohol), and the $C_{10}$- to $C_{18}$-oxo alcohols and the sulfuric esters of secondary alcohols of corresponding chain length. Sulfuric monoesters of aliphatic primary alcohols ethoxylated with from 1 to 6 moles of ethylene oxide and ethoxylated secondary alcohols or alkylphenols are also suitable. Finally, sulfated fatty acid alkanolamides and sulfated fatty acid monoglycerides may be used.

If the surfactants contain sulfonate groups, alkylbenzenesulfonates, α-sulfo fatty acid ester salts or α-sulfo fatty acid ester disalts are preferred. The anionic surfactants are usually present in the form of their sodium salts.

Among nonionic surfactants, primarily adducts of from 2 to 20 moles of ethylene oxide with 1 mole of a compound having essentially from 10 to 20 carbon atoms from the group consisting of the alcohols/alkylphenols are used. Further nonionic surfactants suitable for wash liquors are alkylglycosides or alkylpolyglycosides which have from 8 to 18 carbon atoms.

Graying inhibitors which keep dirt detached from the phase suspended in the wash liquor are in general water-soluble colloids of organic compounds, such as, for example, the water-soluble salts of polymeric carboxylic acids, glue, gelatin, salts of ethercarboxylic acids or ethersulfonic acids of starch or of cellulose or salts of acidic sulfuric esters of cellulose or of starch. Polyamides which contain water-soluble acidic groups are also suitable for this purpose. Polyvinylpyrrolidone, carboxymethylcellulose (sodium salt), methylcellulose and/or mixtures thereof are preferred.

Suitable bleaches are in particular sodium perborate (tetrahydrate or monohydrate), and this also applies to perborax. Peroxycarbonates, peroxypyrophosphates, citrate perhydrates, urea or melamine compounds which give peracidic salts, or peracids, such as perbenzoates, peroxyphthalates, diperazelaic acid or diperdodecandioic acid, may also be used. Other conventional inorganic or organic per compounds may also be employed.

Suitable enzymes for wash liquors proteases, lipases, amylases, cellulases and/or mixtures thereof.

Organopolysiloxanes, microfine silanized silica, paraffins, waxes, microcrystalline waxes and soaps and mixtures thereof may also be used as foam inhibitors in many cases.

Calcium/magnesium stock solutions for establishing a certain water hardness and corresponding heavy metal stock solutions were prepared for the examples below.

Preparation of the Ca/Mg stock solution:

18.94 g of $MgCl_2.6H_2O$ and 40.97 g of $CaCl_2.2H_2O$ are weighed into a 2 l volumetric flask. The volume is then made to 2 l with distilled water at room temperature. 5.6 g of this stock solution are equivalent in the subsequent test solution to 78 ppm of $CaCO_3$ (31.234 mg of Ca) and 22 mg of $MgCO_3$ (6.343 mg of Mg). 22.4 g of this stock solution are equivalent in the subsequent test solution to 312 ppm of $CaCO_3$ (124.936 mg of Ca) and 88 mg of $MgCO_3$ (25.372 mg of Mg).

Preparation of the heavy metal stock solutions:

a) Manganese 14.41 mg of $MnCl_2.4H_2O$ are weighed into a 1 l volumetric flask. The volume is then made up of 1 l with distilled water at room temperature. 5 g of this solution are equivalent in the subsequent test solution to 0.02 ppm of Mn.

b) Copper 1.6098 of $CuCl_2.2H_2O$ are weighed into a 1 l volumetric flask. The volume is then made up to 1 l with distilled water at room temperature. 5 g of this solution are equivalent in the subsequent test solution to 3 ppm of Cu.

c) Zinc 2.085 g of $ZnCl_2$ are weighed into a 1 l volumetric flask. The volume is then made up to 1 l with distilled water at room temperature. 5 g of this solution are equivalent to the subsequent test solution to 5 ppm of Zn.

General method for the determination of the heavy metal binding capacity:

Either 5 g of one of the three heavy metal stock solutions or 5 g of each of the three heavy metal stock solutions are weighed into a 2 l beakers. If it is intended to work with Ca/Mg mixed water hardness, 5.6 g of Ca/Mg stock solution are weighed in to achieve 100 ppm of mixed water hardness or 22.4 g to achieve 400 ppm of mixed water hardness. When 1.0 g of builder is used, the amount is made up to 999 g (999.5 g where 0.5 g of builder is used) with distilled water. In a water thermostat from Lauda, the solution is thermostated at a temperature of 25° C. while stirring with a magnetic stirrer. 0.5 g or 1.0 g of the sample of substance is then added to the solution. The pH is kept at pH 10.0 with 0.1N KOH or 0.1N HCl. After exactly 10 minutes (laboratory stop watch), the solution is filtered through a folded filter (from Schleicher & Schüll), type: ø 320/597½) or a 1 l pressure filter (PTFE filter, pore diameter 0.2–0.45 µm, from Schleicher & Schüll or Satorius). 500 g of the filtrate are weighed into a glass bottle cleaned with hydrochloric acid, and 5 g of concentrated hydrochloric acid are added. The heavy metal determination is carried out with the aid of atomic absorption spectroscopy.

In Examples 1 to 16, the following (builder) substances were used:

(A) Crystalline sodium disilicate (SKS-6) from HOECHST AG, Germany, having a molar $SiO_2/Na_2O$ ratio of 2.0.

(B) Commercial amorphous sodium disilicate having a molar $SiO_2/Na_2O$ ratio of 2.0 and a water content of about 19% (determined as loss on ignition).

(C) Commercial sodium carbonate/sodium disilicate mixture, prepared by spray-drying of solutions of sodium silicate and sodium carbonate. The mixture contains about 55% by weight of sodium carbonate, 29% by weight of sodium disilicate and 16% by weight of water.

(D) Commercial zeolite A.

In Examples 17 to 20, a detergent having the composition 48 parts by weight of crystalline sodium disilicate (SKS-6)

15 parts by weight of sodium bicarbonate 15 parts by weight of sodium carbonate peroxyhydrate (percarbonate)

additives to 100 parts by weight was used. The additives incorporated were TAED, phosphonate, nonionic surfactant, enzymes, optical brighteners, perfume, foam inhibitor and sodium sulfate.

EXAMPLE 1

In accordance with the general method, 0.5 g each of SKS-6 (A), amorphous sodium disilicate (B), sodium carbonate/sodium disilicate mixture (C) and zeolite A (D) are added to a Ca/Mg-free aqueous solution which contains 0.02 ppm of Mn. After the procedure described in the general method has been followed, 0.0017 ppm of Mn is found in the filtrate solution in the case of SKS-6 (A) (B: 0.009 ppm, C: 0.018 ppm, D: 0.001 ppm of Mn). On conversion, this gives an Mn binding capacity of 91.5% for SKS-6 (B: 55%, C: 10%, D: 97.5%).

EXAMPLE 2

In accordance with the general method, 0.5 g each of SKS-6 (A), amorphous sodium disilicate (B), sodium carbonate/sodium disilicate mixture (C) and zeolite A (D) are added to a Ca/Mg-free aqueous solution which contains 3 ppm of Cu. After the procedure described in the general method has been followed, 1.8 ppm of Cu is found in the filtrate solution in the case of SKS-6 (A) (B: 3 ppm, C: 3 ppm, D: 0.005 ppm of Cu). On conversion, this gives a Cu binding capacity of 40.0% for SKS-6 (B: 0.0%, C: 0.0%, D: 99.8%).

EXAMPLE 3

In accordance with the general method, 0.5 g each of SKS-6 (A), amorphous sodium disilicate (B), sodium carbonate/sodium disilicate mixture (C) and zeolite A (D) are added to a Ca/Mg-free aqueous solution which contains 5 ppm of Zn. After the procedure described in the general method has been followed, 0.12 ppm of Zn is found in the filtrate solution in the case of SKS-6 (A) (B: 4.1 ppm, C: 4.8 ppm, D: 0.05 ppm of Zn). On conversion, this gives a Zn binding capacity of 97.6% for SKS-6 (B: 18.0%, C: 4.0%, D: 99.0%).

EXAMPLE 4

In accordance with the general method, 0.5 g each of SKS-6 (A), amorphous sodium disilicate (B), sodium carbonate/sodium disilicate mixture (C) and zeolite A (D) are added to a Ca/Mg-free aqueous solution which contains 0.02 ppm of Mn and 3 ppm of Cu and 5 ppm of Zn. After the procedure described in the general method has been followed, 0.0019 ppm of Mn, 1.8 ppm of Cu and 1.1 ppm of Zn are found in the filtrate solution in the case of SKS-6 (A) (B: 0.019 ppm of Mn, 2.9 ppm of Cu, 5.2 ppm of Zn; C: 0.02 ppm of Mn, 2.9 ppm of Cu, 4.8 ppm of Zn; D: 0.001 ppm of Mn, 0.013 ppm of Cu, 0.05 ppm of Zn). On conversion, this gives a heavy metal binding capacity of 90.5% for Mn, of 40.0% for Cu and of 78.0% for Zn in the case of SKS-6 (B: Mn 5.0%, Cu 3.3%, Zn 4.0%; C: Mn 0.0%, Cu 3.3%, Zn 4.0%, D: Mn 97.5%, Cu 99.6%, Zn 99.0%).

EXAMPLE 5

In accordance with the general method, 1.0 g each of SKS-6 (A) or zeolite A (D) are added to a Ca/Mg-free aqueous solution which contains 0.02 ppm of Mn. After the procedure described in the general method has been followed, 0.0015 ppm of Mn is found in the filtrate solution in the case of SKS-6 (A) (D: 0.001 ppm of Mn). On conversion, this gives an Mn binding capacity of 9.25% for SKS-6 (D: 97.5%).

EXAMPLE 6

In accordance with the general method, 1.0 g each of SKS-6 (A) or zeolite A (D) are added to a Ca/Mg-free aqueous solution which contains 3 ppm of Cu. After the procedure described in the general method has been followed, 1.8 ppm of Cu is found in the filtrate solution in the case of SKS-6 (A) (D: 0.006 ppm of Cu). On conversion, this gives a Cu binding capacity of 40.0% for SKS-6 (D: 99.8%).

EXAMPLE 7

In accordance with the general method, 1.0 g each of SKS-6 (A) or zeolite A (D) are added to a Ca/Mg-free aqueous solution which contains 5 ppm of Zn. After the procedure described in the general method has been followed, 0.24 ppm of Zn is found in the filtrate solution in the case of SKS-6 (A) (D: 0.02 ppm of Zn). On conversion, this gives a Zn binding capacity of 95.2% for SKS-6 (D: 99.6%).

EXAMPLE 8

In accordance with the general method, 1.0 g each of SKS-6 (A) or zeolite A (D) are added to a Ca/Mg-free aqueous solution which contains 0.02 ppm of Mn and 3 ppm of Cu and 5 ppm of Zn. After the procedure described in the general method has been followed, 0.003 ppm of Mn, 1.3 ppm of Cu and 0.59 ppm of Zn are found in the filtrate solution in the case of SKS-6 (A) (D: 0.001 ppm of Mn, 0.05 ppm of Cu, 0.05 ppm of Zn). On conversion, this gives a heavy metal binding capacity of 85.0% for Mn, 56.7% for Cu and 88.2% for Zn in the case of SKS-6 (D: Mn 97.5%. Cu 99.9%, Zn 99.0%).

EXAMPLE 9

In accordance with the general method, 0.5 g each of SKS-6 (A), amorphous sodium disilicate (B), sodium carbonate/sodium disilicate mixture (C) and zeolite A (D) are added to an aqueous solution which contains 100 ppm of Ca/Mg mixed water hardness and 0.02 ppm of Mn. After the procedure described in the general method has been followed, 0.001 ppm of Mn is found in the filtrate solution in the case of SKS-6 (A) (B: 0.004 ppm, C: 0.02 ppm, D: 0.0009 ppm of Mn). On conversion, this gives an Mn binding capacity of 95.0% for SKS-6 (B: 80.0%, C: 0.0%, D: 95.5%).

EXAMPLE 10

In accordance with the general method, 0.5 g each of SKS-6 (A), amorphous sodium disilicate (B), sodium carbonate/sodium disilicate mixture (C) and zeolite A (D) are added to an aqueous solution which contains 100 ppm of Ca/Mg mixed water hardness and 3 ppm of Cu. After the procedure described in the general method has been followed, 0.08 ppm of Cu is found in the filtrate solution in the case of SKS-6 (A) (B: 0.19 ppm, C: 3 ppm, D: 0.014 ppm of Cu). On conversion, this gives a Cu binding capacity of 97.3% for SKS-6 (B: 93.7%, C: 0.0%, D: 99.5%).

EXAMPLE 11

In accordance with the general method, 0.5 g each of SKS-6 (A), amorphous sodium disilicate (B), sodium carbonate/sodium disilicate mixture (C) and zeolite A (D) are added to an aqueous solution which contains 100 ppm of Ca/Mg mixed water hardness and 5 ppm of Zn. After the procedure described in the general method has been followed, 0.09 ppm of Zn is found in the filtrate solution in the case of SKS-6 (A) (B: 1.05 ppm, C: 5 ppm, D: 0.16 ppm of Zn). On conversion, this gives a Zn binding capacity of 98.2% for SKS-6 (B: 79.0%, C: 0.0%, D: 96.8%).

EXAMPLE 12

In accordance with the general method, 0.5 g each of SKS-6 (A), amorphous sodium disilicate (B), sodium carbonate/sodium disilicate mixture (C) and zeolite A (D) are added to an aqueous solution which contains 100 ppm of Ca/Mg mixed water hardness, 0.02 ppm of Mn, 3 ppm of Cu and 5 ppm of Zn. After the procedure described in the general method has been followed, 0.0006 ppm of Mn, 0.34 ppm of Cu and 0.13 ppm of Zn are found in the filtrate solution in the case of SKS-6 (A) (B: 0.016 ppm of Mn, 2.2 ppm of Cu, 3.5 ppm of Zn; C: 0.02 ppm of Mn, 3 ppm of Cu, 5 ppm of Zn; D: 0.0006 ppm of Mn, 0.005 ppm of Cu, 0.09 ppm of Zn). On conversion, this gives a heavy metal binding capacity of 97.0% for Mn, 88.7% for Cu and 97.4% for Zn in the case of SKS-6 (B: Mn 20.0%, Cu 26.7%, Zn 30.0%; C: Mn 0.0%, Cu 0.0%, Zn 0.0%, D: Mn 97.0%, Cu 99.8%, Zn 98.2%).

In accordance with the general method, 1.0 g each of SKS-6 (A), amorphous sodium disilicate (B), sodium carbonate/sodium disilicate mixture (C) and zeolite A (D) are added to an aqueous solution which contains 400 ppm of Ca/Mg mixed water hardness and 0.02 ppm of Mn. After the procedure described in the general method has been followed, 0.0005 ppm of Mn is found in the filtrate solution in the case of SKS-6 (A) (B: 0.001 ppm, C: 0.0011 ppm, D: 0.003 ppm of Mn). On conversion, this gives an Mn binding capacity of 97.5% for SKS-6 (B: 97.0%, C: 94.5%, D: 85.0%).

EXAMPLE 14

In accordance with the general method, 1.0 g each of SKS-6 (A), amorphous sodium disilicate (B), sodium carbonate/sodium disilicate mixture (C) and zeolite A (D) are added to an aqueous solution which contains 400 ppm of Ca/Mg mixed water hardness and 3 ppm of Cu. After the procedure described in the general method has been followed, 0.0005 ppm of Cu is found in the filtrate solution in the case of SKS-6 (A) (B: 0.006 ppm, C: 0.04 ppm, D: 0.03 ppm of Cu). On conversion, this gives a Cu binding capacity of 99.8% for SKS-6 (B: 99.8%, C: 98.7%, D: 99.0%).

EXAMPLE 15

In accordance with the general method, 1.0 g each of SKS-6 (A), amorphous sodium disilicate (B), sodium carbonate/sodium disilicate mixture (C) and zeolite A (D) are added to an aqueous solution which contains 400 ppm of Ca/Mg mixed water hardness and 5 ppm of Zn. After the procedure described in the general method has been followed, 0.02 ppm of Zn is found in the filtrate solution in the case of SKS-6 (A) (B: 0.02 ppm, C: 0.06 ppm, D: 0.01 ppm of Zn). On conversion, this gives a Zn binding capacity of 99.6% for SKS-6 (B: 99.6%, C: 98.8%, D: 98.0%).

EXAMPLE 16

In accordance with the general method, 1.0 g each of SKS-6 (A), amorphous sodium disilicate (B), sodium carbonate/sodium disilicate mixture (C) and zeolite A (D) are added to an aqueous solution which contains 400 ppm of Ca/Mg mixed water hardness, 0.02 ppm of Mn, 3 ppm of Cu and 5 ppm of Zn. After the procedure described in the general method has been followed, 0.0005 ppm of Mn, 0.003 ppm of Cu and 0.05 ppm of Zn are found in the filtrate solution in the case of SKS-6 (A) (B: 0.0005 ppm of Mn, 0.012 ppm of Cu, 0.05 ppm of Zn; C: 0.0006 ppm of Mn, 0.029 ppm of Cu, 0.05 ppm of Zinc; D: 0.0013 ppm of Mn, 0.022 ppm of Cu, 0.23 ppm of Zn). On conversion, this gives a heavy metal binding capacity of 97.5% for Mn, 99.9% for Cu and 99.0% for Zn in the case of SKS-6 (B: Mn 97.5%, Cu 99.6%, Zn 99.0%; C: Mn 97.0%, Cu 99.0%, Zn 99.0%; D: Mn 93.5%, Cu 99.3%, Zn 95.4%).

EXAMPLE 17

In accordance with the general method, 2.35 g of the detergent (I) are added in each case to an aqueous solution which contains 100 ppm of Ca/Mg mixed water hardness of 0.02 ppm of Mn. After the procedure described in the general method has been followed, 0.001 ppm of Mn is found in the filtrate solution for the detergent (I) [containing (A)]. On conversion, this gives an Mn binding capacity of 95% for (A).

EXAMPLE 18

In accordance with the general method, 2.35 g of the detergent (I) are added in each case to an aqueous solution which contains 100 ppm of Ca/Mg mixed water hardness and 3 ppm of Cu. After the procedure described in the general method has been followed, 0.174 ppm of Cu is found in the filtrate solution for the detergent (I) [containing (A)]. On conversion, this gives a Cu binding capacity of 94.2% for (A).

EXAMPLE 19

In accordance with the general method, 2.35 g of the detergent (I) are added in each case to an aqueous solution which contains 100 ppm of Ca/Mg mixed water hardness of 5 ppm of Zn. After the procedure described in the general method has been followed, 0.11 ppm of Zn is found in the filtrate solution for the detergent (I) [containing (A)]. On conversion, this gives a Zn binding capacity of 97.8% for (A).

EXAMPLE 20

In accordance with the general method, 2.35 g of the detergent (I) are added in each case to an aqueous solution which contains 100 ppm of Ca/Mg mixed water hardness of 0.02 ppm of Mn, 3 ppm of Cu and 5 ppm of Zn. After the procedure described in the general method has been followed, 0.0006 ppm of Mn, 0.12 ppm of Cu and 0.19 ppm of Zn are found in the filtrate solution for the detergent (I) [containing (A)]. On conversion, this gives a heavy metal binding capacity of 97.0% for Mn, 96.0% for Cu and 96.2% for Zn for (A).

Compared with zeolite-containing systems, SKS-6 (A) has the advantage that it can also be used in systems in which percarbonates are present (zeolites have an adverse effect on percarbonates and—as a function of time—reduce the amount of oxygen having washing activity).

I claim:
1. A process for reducing the concentration of heavy metals from aqueous systems having a pH of from 9.3 to 11.5, and from 2 to 30 degrees of German hardness,
    said systems are selected from the group consisting of wash liquors, effluent, cooling water, and cleaning water,
    said process consisting of treating said systems with sheet silicates of the formula

$$Na\ M\ Si_x\ O_{2x-1} \cdot y\ H_2O$$

in which x is from 1.9 to 4, M is Na or H and y is from 0 to 20.

2. The process as claimed in claim 1, wherein the heavy metals are manganese, copper and/or zinc.

3. The process as claimed in claim 1, wherein the water hardness in the aqueous system from 5 to 20 degrees of German hardness.

4. The process as claimed in claim 1, wherein the aqueous system contains washing assistants, surfactants, bleach activators, bleach systems, graying inhibitors, builders or builder systems, enzymes, optical brighteners, foam regulators, fillers and/or polymers.

5. The process as claimed in claim 4, wherein the surfactants are anionic and/or nonionic surfactants.

6. The process as claimed in claim 4, wherein the surfactants are nonionic and/or cationic surfactants.

7. The process as claimed in claim 4, wherein the filler is sodium sulfate.

8. The process as claimed in claim 4, wherein the polymers are homopolymeric or copolymeric carboxylic acids or salts thereof.

9. The process as claimed in claim 8, wherein acrylic acid, methacrylic acid and/or maleic acid or salts thereof are present.

10. The process as claimed in claim 4, wherein the builders and/or builder systems are zeolite A or P, citric acid, sodium citrate, sodium tripolyphosphate, sodium carbonate, sodium bicarbonate and/or organic builders.

* * * * *